(12) United States Patent
Matsumura et al.

(10) Patent No.: US 11,644,877 B2
(45) Date of Patent: *May 9, 2023

(54) BATTERY HEAT BALANCING DURING PEAK POWER MODE

(71) Applicant: Intel Corporation, Santa Clara, CA (US)

(72) Inventors: Naoki Matsumura, San Jose, CA (US); Andy Keates, Los Gatos, CA (US); Brian Fritz, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,861

(22) Filed: Jun. 24, 2021

(65) Prior Publication Data

US 2021/0318737 A1    Oct. 14, 2021

Related U.S. Application Data

(63) Continuation of application No. 16/203,302, filed on Nov. 28, 2018, now Pat. No. 11,126,232.

(51) Int. Cl.
| | | |
|---|---|---|
| *G06F 1/20* | (2006.01) | |
| *G06F 1/26* | (2006.01) | |
| *H01M 10/617* | (2014.01) | |
| *H01M 10/63* | (2014.01) | |
| *H02J 7/00* | (2006.01) | |

(52) U.S. Cl.
CPC ............. *G06F 1/206* (2013.01); *G06F 1/26* (2013.01); *H01M 10/617* (2015.04); *H01M 10/63* (2015.04); *H02J 7/00714* (2020.01); *H02J 7/007194* (2020.01)

(58) Field of Classification Search
CPC ........ G06F 1/206; G06F 1/26; H01M 10/617; H01M 10/63; H02J 7/0063
See application file for complete search history.

(56) References Cited

U.S. PATENT DOCUMENTS

| | | | |
|---|---|---|---|
| 5,783,998 A | 7/1998 | Nakajou et al. | |
| 6,459,175 B1 | 10/2002 | Potega | |
| 6,785,829 B1 | 8/2004 | George et al. | |
| 7,058,824 B2 * | 6/2006 | Plante | G06F 1/324 |
| | | | 713/320 |

(Continued)

FOREIGN PATENT DOCUMENTS

WO    2012075301    6/2012

OTHER PUBLICATIONS

Final Office Action from U.S. Appl. No. 16/203,302 dated Jan. 19, 2021, 21 pgs.

(Continued)

*Primary Examiner* — Aurel Prifti
(74) *Attorney, Agent, or Firm* — Schwabe, Williamson & Wyatt, P.C.

(57) ABSTRACT

In some examples, a control unit is configured to consider battery heat. The control unit is adapted to provide power from a battery to a system during a peak power mode that includes peak power and off-peak power, and consider heat balance in the battery during the peak power mode by providing peak power so that heat of the battery corresponds to a reference condition heat of the battery.

23 Claims, 8 Drawing Sheets

(56) References Cited

U.S. PATENT DOCUMENTS

| | | | |
|---|---|---|---|
| 7,570,025 B2* | 8/2009 | Kim | H02J 7/00047 |
| | | | 320/132 |
| 7,990,109 B2 | 8/2011 | White et al. | |
| 8,397,088 B1 | 3/2013 | Ghose | |
| 9,703,341 B1 | 7/2017 | Sultenfuss et al. | |
| 10,175,734 B1* | 1/2019 | Bourgeault | G06F 1/26 |
| 10,275,007 B2* | 4/2019 | Buhot | G06F 9/4893 |
| 2001/0001532 A1 | 5/2001 | Galbraith et al. | |
| 2002/0036481 A1 | 3/2002 | Nagase | |
| 2002/0194509 A1* | 12/2002 | Plante | G06F 1/324 |
| | | | 713/300 |
| 2003/0057918 A1 | 3/2003 | Aoki et al. | |
| 2003/0188210 A1 | 10/2003 | Nakazato | |
| 2004/0070371 A1 | 4/2004 | Chern et al. | |
| 2005/0146816 A1 | 7/2005 | Nguyen et al. | |
| 2005/0289375 A1 | 12/2005 | Ranganathan et al. | |
| 2008/0007224 A1 | 1/2008 | Melichar | |
| 2008/0058999 A1 | 3/2008 | Khodorkovsky et al. | |
| 2009/0037754 A1* | 2/2009 | Cha | G06F 1/206 |
| | | | 713/601 |
| 2009/0089602 A1 | 4/2009 | Bose et al. | |
| 2009/0147423 A1* | 6/2009 | Mulligan | H02J 7/0029 |
| | | | 361/91.1 |
| 2009/0243549 A1 | 10/2009 | Matsumura et al. | |
| 2010/0000809 A1 | 1/2010 | Nishi et al. | |
| 2012/0001489 A1 | 1/2012 | Hermerding, II et al. | |
| 2012/0086368 A1 | 4/2012 | Kawabuchi et al. | |
| 2012/0139345 A1 | 6/2012 | Ye et al. | |
| 2013/0009463 A1* | 1/2013 | Iwasaki | H02J 3/322 |
| | | | 307/18 |
| 2013/0082660 A1 | 4/2013 | Plestid | |
| 2013/0227327 A1 | 8/2013 | Chun et al. | |
| 2013/0254579 A1 | 9/2013 | Derbyshire et al. | |
| 2014/0009131 A1 | 1/2014 | Shilimkar et al. | |
| 2014/0013098 A1* | 1/2014 | Yeung | G06F 1/206 |
| | | | 713/100 |
| 2014/0067139 A1 | 3/2014 | Berke et al. | |
| 2014/0115363 A1 | 4/2014 | Tu et al. | |
| 2014/0325247 A1 | 10/2014 | Sodhi et al. | |
| 2014/0358288 A1 | 12/2014 | Huang | |
| 2015/0119094 A1 | 4/2015 | Bartels et al. | |
| 2015/0130700 A1 | 5/2015 | Chen et al. | |
| 2015/0134981 A1 | 5/2015 | Nagato | |
| 2015/0249335 A1 | 9/2015 | Waheed et al. | |
| 2015/0355698 A1 | 12/2015 | Luo et al. | |
| 2016/0181830 A1 | 6/2016 | Matsumura et al. | |
| 2016/0299560 A1 | 10/2016 | Kondo | |
| 2016/0301226 A1 | 10/2016 | Matsumura et al. | |
| 2016/0320456 A1 | 11/2016 | Hawawini et al. | |
| 2016/0320827 A1 | 11/2016 | Ou Yang et al. | |
| 2016/0336762 A1* | 11/2016 | Hunter | H02J 7/0063 |
| 2016/0380455 A1 | 12/2016 | Greening et al. | |
| 2017/0038806 A1 | 2/2017 | Prajapati et al. | |
| 2017/0060213 A1 | 3/2017 | Wu et al. | |
| 2017/0092996 A1* | 3/2017 | Rodriguez | H02J 7/0048 |
| 2017/0102751 A1 | 4/2017 | Zeng | |
| 2017/0117721 A1 | 4/2017 | Toya | |
| 2017/0179733 A1 | 6/2017 | Matsumura et al. | |
| 2017/0220445 A1 | 8/2017 | Cunningham et al. | |
| 2017/0222464 A1 | 8/2017 | Pullen et al. | |
| 2017/0255213 A1 | 9/2017 | Oikarinen | |
| 2017/0269652 A1 | 9/2017 | Lee et al. | |
| 2017/0293332 A1* | 10/2017 | Rotem | G06F 1/26 |
| 2018/0141458 A1 | 5/2018 | Jammoul et al. | |
| 2018/0157315 A1 | 6/2018 | Ehsan et al. | |
| 2018/0219389 A1 | 8/2018 | Binder et al. | |
| 2018/0232032 A1* | 8/2018 | Wang | G06F 1/3234 |
| 2018/0284879 A1 | 10/2018 | Gorbatov et al. | |
| 2018/0324979 A1 | 11/2018 | North et al. | |
| 2018/0337536 A1 | 11/2018 | Li et al. | |
| 2018/0364786 A1* | 12/2018 | de la Cropte de Chanterac | |
| | | | G06F 1/329 |
| 2019/0011969 A1 | 1/2019 | Atkinson et al. | |
| 2019/0036367 A1 | 1/2019 | Sultenfuss et al. | |
| 2019/0058336 A1 | 2/2019 | Thompson et al. | |
| 2019/0058352 A1 | 2/2019 | Gow et al. | |
| 2019/0115772 A1 | 4/2019 | Takeda et al. | |
| 2019/0190087 A1* | 6/2019 | Tsai | H01M 10/44 |
| 2019/0204902 A1* | 7/2019 | Gibney | G06F 1/28 |
| 2019/0305684 A1 | 10/2019 | Sonntag | |
| 2020/0004306 A1 | 1/2020 | Uan-Zo-Li | |
| 2020/0052519 A1* | 2/2020 | Thompson | H02J 7/0071 |
| 2020/0058968 A1 | 2/2020 | Thompson et al. | |

OTHER PUBLICATIONS

Non-Final Office Action from U.S. Appl. No. 16/203,302 dated Jun. 22, 2020, 21 pgs.

Notice of Allowance from U.S. Appl. No. 16/203,302 dated May 19, 2021, 8 pgs.

* cited by examiner

100

300

500

BATTERY HEAT BALANCING DURING PEAK POWER MODE

CLAIM OF PRIORITY

This application is a continuation of, and claims the benefit of priority to, U.S. patent application Ser. No. 16/203,302, filed on Nov. 28, 2018, issued as U.S. Pat. No 11,126,232 on Sep. 21, 2021, and titled "BATTERY HEAT BALANCING DURING PEAK POWER MODE," which is incorporated by reference in entirety.

TECHNICAL FIELD

This disclosure relates to battery heat balancing during peak power mode.

BACKGROUND

A computing system such as a PC (personal computer) or a datacenter computer (for example, a server computing system) may enhance its performance by, instead of or in addition to receiving power from a power supply unit (PSU), extracting current from an attached battery (for example, an attached battery such as a lithium ion or Li-ion battery). This enhancement of performance by extracting current from an attached battery can be referred to as peak power mode. Peak power mode can provide an ability to go to high power while on battery power or while receiving AC power (for example, from a power supply unit), or while receiving power from both a battery and from AC power. For example, peak power mode may be implemented during times of peak power needs of the system.

However, in some cases, the high current used during peak power mode may damage the battery, and cycle life may be worse than a reference cycle life. This may cause system manufacturers to refrain from using high-performance peak power modes, leading to a degradation in system performance. This can deny users of the system from experiencing the full potential of the computing system.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to dynamic battery power techniques. Some embodiments relate to peak power mode. Some embodiments relate to battery heat balancing during peak power mode (for example, balancing of the surface heat of the battery). Some embodiments relate to considering heat balance in the battery (for example, surface heat of the battery) during peak power mode. Some embodiments relate to battery heat balancing during a peak power mode that includes peak power and off-peak power. Some embodiments relate to providing power from a battery to a system during peak power mode, and considering heat balance in the battery during the peak power mode by providing peak power based on a reference condition heat of the battery over the time period (for example, based on a reference heat during a reference discharge mode). In some embodiments, peak power mode may be enabled without additional degradation in the cycle life as compared with a reference condition. For example, some embodiments relate to extracting current from a battery during peak power mode without additional degradation in the battery life cycle as compared with a reference condition.

Figure 1:
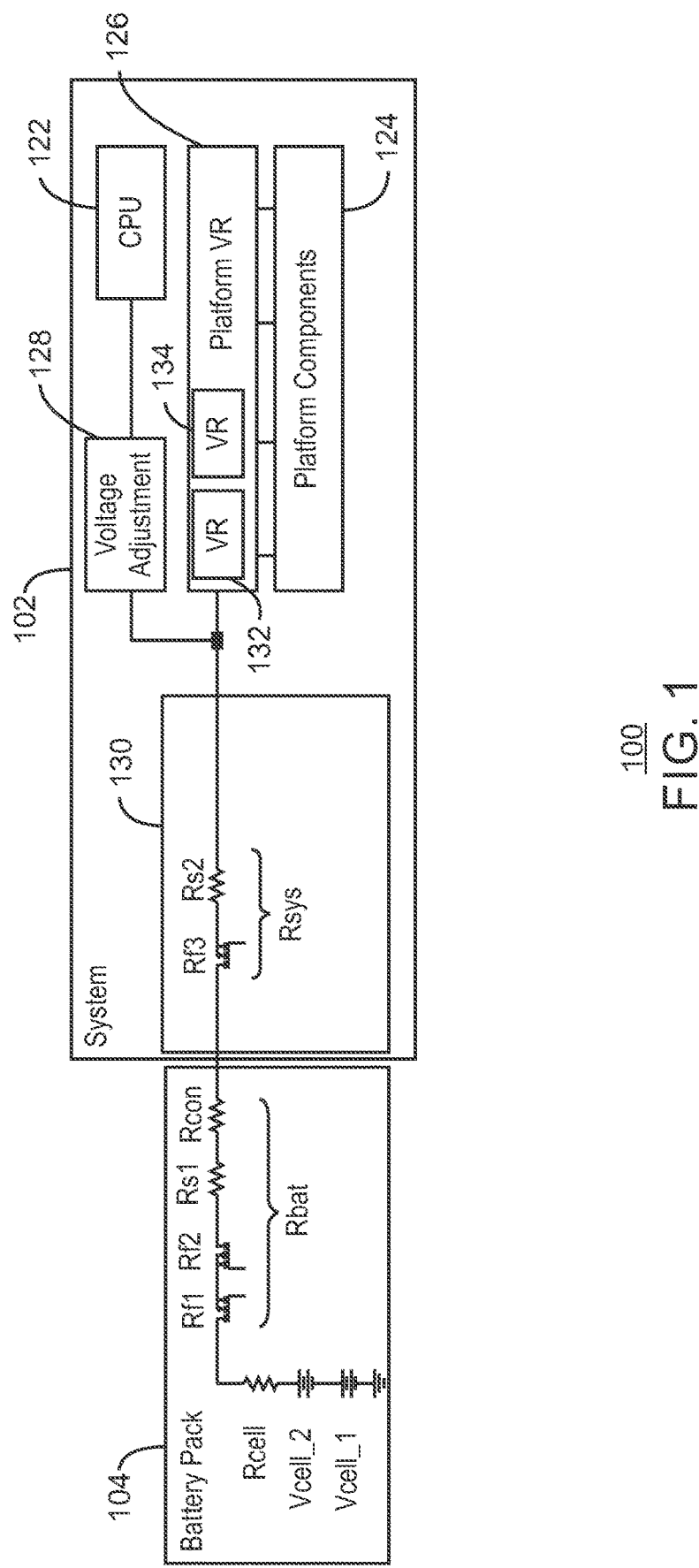
FIG. 1 illustrates a system in accordance with some embodiments.

FIG. 1 illustrates a system 100 in accordance with some embodiments. In some embodiments, system 100 includes a power supply (for example, in some embodiments, a power supply unit). In some embodiments, system 100 includes a power supply system (for example, a stationary power supply system such as a PC or desktop power supply system, or such as a server power supply system). In some embodiments, the power supply unit (PSU) can convert AC power to low-voltage regulated DC power for the internal components of a system such as a computing system 102. In some embodiments, system 100 does not include a power supply unit and is powered only by battery power.

System 100 includes computing system 102 and a battery pack 104. Battery pack 104 can help provide power to system 102. In some embodiments, battery pack 104 can be a lithium ion battery pack (or Li-ion battery pack). Battery pack can include voltage cell Vcell_1, Vcell_2, Rcell, and other battery resistance Rbat. Battery resistance Rbat can include, for example, resistance Rs1, resistance Rcon, transistor resistance Rf1, transistor resistance Rf2, etc. In some embodiments, computing system 102 includes a processor 122 such as, for example, a central processing unit (CPU), platform components 124, platform voltage regulation (VR) 126, voltage adjustment 128, and system resistance 130. In some embodiments, platform VR 126 can include a number of voltage regulators such as, for example, voltage regulator (VR) 132 and voltage regulator (VR) 134. Voltage adjustment 128 can be, for example, technology that can dynamically adjust the voltage of processor 122. The voltage adjustment can be based on processor activity to reduce processor power. It can allow for higher clock speed at a given power consumption, or lower consumption at a given clock frequency, for example. In some embodiments, system resistance 130 (Rsys) can be illustrated by resistance Rs2 and/or transistor resistance Rf3.

In some embodiments, any of the techniques (for example, dynamic battery power techniques) as described and/or illustrated herein (such as, for example, battery heat balancing during peak power mode) may be implemented using firmware in battery pack 104, power management within system 102, firmware and/or software in system 102, an operating system running on system 102, processor 122 (for example, executing stored instructions in storage of processor 122, executing stored instructions stored in other storage or memory of system 102, and/or firmware of processor 122, etc.), and/or some combination thereof.

Figure 2:
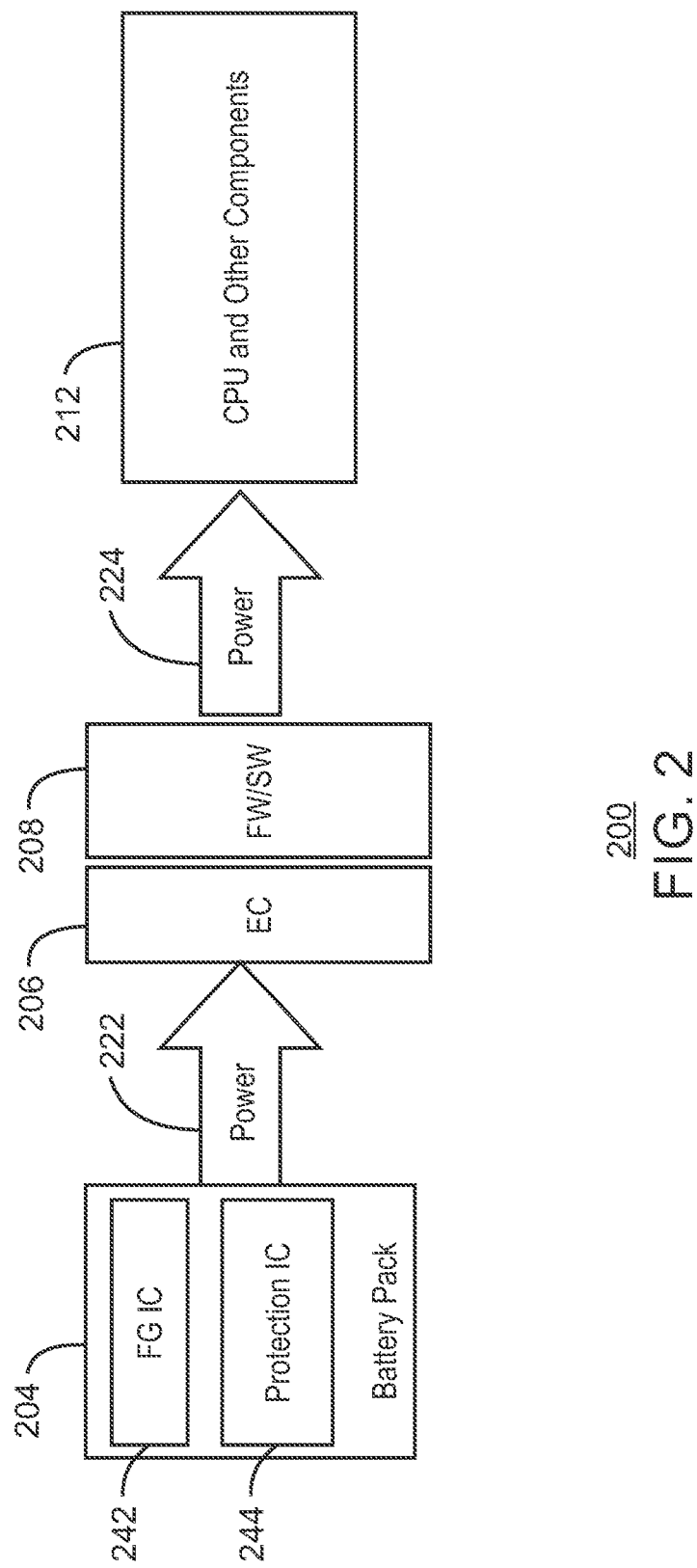
FIG. 2 illustrates a system in accordance with some embodiments.

FIG. 2 illustrates a system 200 in accordance with some embodiments. In some embodiments, system 200 includes a power supply (for example, in some embodiments, a power supply unit). In some embodiments, system 200 includes a power supply system (for example, a stationary power supply system such as a PC or desktop power supply system, or such as a server power supply system). In some embodiments, the power supply unit (PSU) can convert AC power to low-voltage regulated DC power for the internal components of a system such as a computing system. In some embodiments, system 200 does not include an AC power supply unit and is powered only by battery power.

In some embodiments, system 200 includes a battery pack 204, an embedded controller (EC) 206, firmware/software (FW/SW) 208, and a processor (or CPU) and other system components 212. In some embodiments, battery pack 104 can be a lithium ion battery pack (or Li-ion battery pack). In some embodiments, battery pack 204 can be the same as or similar as battery pack 104. Battery pack 204 can provide power 222 (for example, including power communications and/or control) to EC 206 and/or FW/SW 208, which can provide power 224 (for example, including power communications and/or control) to the processor and other system components 212. In some embodiments, battery pack 204 can include a fuel gauge integrated circuit 242 (fuel gauge IC or FGIC) and a protection integrated circuit 244 (protection IC). In some embodiments, the other system components including in 212 can be, for example, display, modem, and/or other system components, etc. In some embodiments, processor and other components 212 can be included in a computing system such as, for example, computing system 102. In some embodiments, the embedded controller 206 and the firmware/software 208 can be provided in a battery pack (for example, in a battery back such as battery pack 204 and/or battery pack 104). In some embodiments, the embedded controller 206 and the firmware/software 208 can be included in a same computing system as the processor and other components 212, and/or in computing system 102. In some embodiments, embedded controller 206 and/or firmware/software 208 can help implement battery heat balancing during peak power mode according to techniques as described and/or illustrated anywhere herein.

In some embodiments, any of the techniques (for example, dynamic battery power techniques) as described and/or illustrated herein (such as, for example, battery heat balancing during peak power mode) may be implemented using firmware in battery pack 204, fuel gauge 242, protection IC 244, embedded controller 206, firmware/software 208, power management within processor and components 212, firmware and/or software in 212, an operating system running on 212, CPU/processor 212 (for example, executing stored instructions in storage of the processor), executing stored instructions stored in other storage or memory within 212, and/or firmware of the processor within 212, etc.), and/or some combination thereof.

Figure 3:
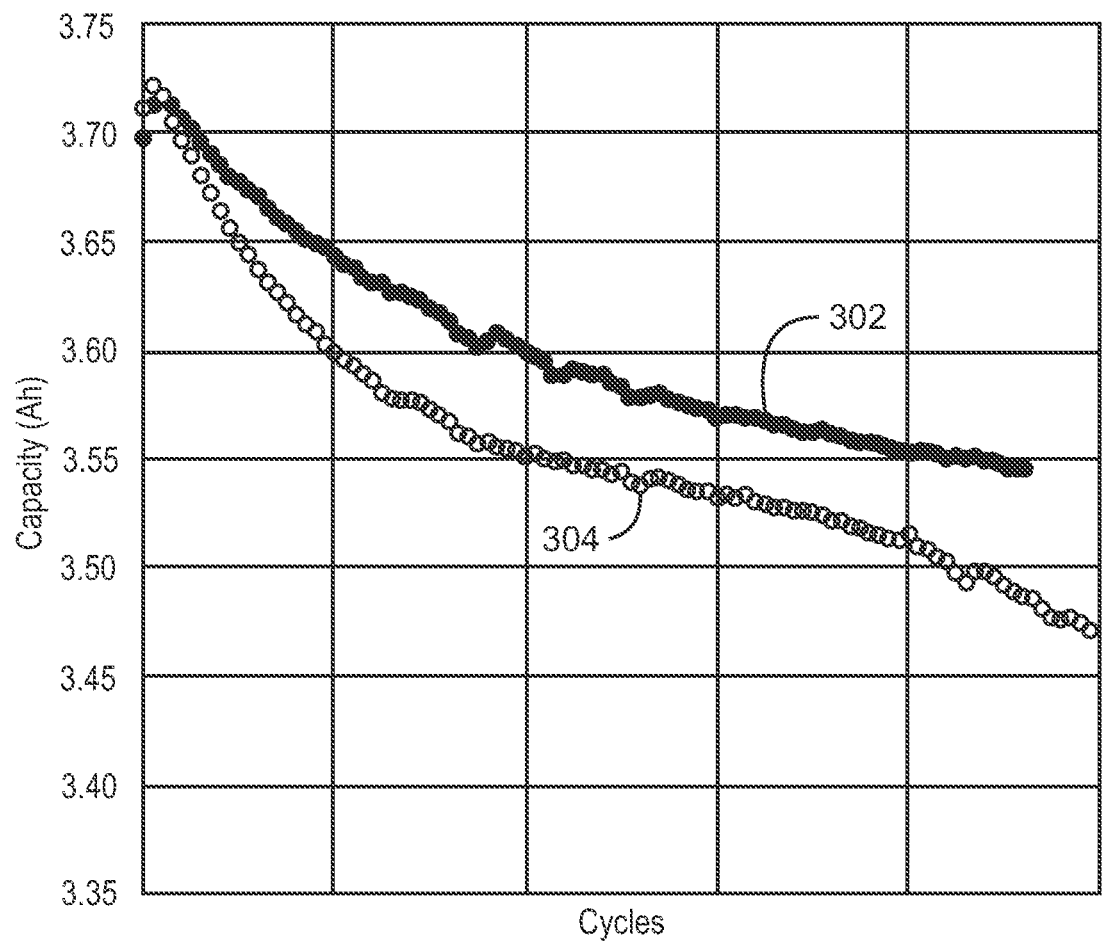
FIG. 3 illustrates a graph illustrating cycle test results under reference and peak power mode conditions.

FIG. 3 illustrates a graph 300 illustrating cycle test results under reference and peak power mode conditions. Graph 300 includes a reference power condition graph 302 and a peak power mode condition graph 304. In some embodiments, graph 300 illustrates battery capacity over time during reference discharge conditions (graph 302) and during a peak power mode (graph 304).

As discussed above, a computing system such as a PC (personal computer) or a datacenter computer (for example, a server computing system) may enhance its performance by, instead of or in addition to receiving power from a power supply unit (PSU), extracting current from an attached battery (for example, an attached battery such as a lithium ion or Li-ion battery). This enhancement of performance by extracting current from an attached battery can be referred to as peak power mode. For example, peak power mode may be implemented during times of peak power needs of the system.

However, in some cases, the high current used during peak power mode may damage the battery, and cycle life may be worse than a reference cycle life. This may cause system manufacturers to refrain from using high-performance peak power modes, leading to a degradation in system performance. This can deny users of the system from experiencing the full potential of the computing system.

Repeated and uncontrolled use of peak currents can reduce the service life of a battery. For example, cycle test conditions of reference power 302 and peak power mode 304 may be defined as follows, resulting in graph 300, which illustrates that peak power mode 304 can provide worse cycle life than reference mode 302, even though average current during the reference condition and the peak power mode is the same.

For example, in some embodiments, the reference cycle life condition graph 302 illustrated in FIG. 3 can be based on a charge of 1 C constant charge (CC), followed by 4.4V constant voltage (CV) until 0.05 C cutoff, and discharge of 1 C until 3.0V cutoff. The peak power mode cycle life condition graph 304 illustrated in FIG. 3 can be based on a charge that is the same as defined above for the reference cycle life condition, and discharge of 2.5 C for 10 seconds (peak) followed by 0.3 C for 21 seconds (it is noted that this equals 1.0 C on average), and repeating the 2.5 C and 0.3 C discharge until the voltage hits 3.0V and then 1 C discharge until 3.0V cutoff. FIG. 3 illustrates the reduction in life cycle using a peak power mode can reduce the serviceable life perceived by the user. However, in accordance with some embodiments, peak power mode can be enabled without additional cycle life degradation (for example, without additional cycle life degradation perceived by a user) as compared to the reference condition.

In accordance with some embodiments, heat balance in a battery (for example, surface heat of the battery) can be considered during peak power mode. A current and duration of peak power and/or off-peak power can be defined so that heat from the battery (for example, battery surface heat) per a particular time period is similar to the reference condition. This can be defined by Equation 1, as follows:

$$H(\text{peak power}) = H(\text{ref}) \qquad \text{EQUATION 1}$$

where H(peak power) is heat from a battery (for example, battery surface heat) over a specific time period under peak power mode, and where H(ref) is heat from the battery (for example, battery surface heat) over a specific time period under a reference condition (for example, is a heat from the battery during a reference discharge mode).

In some embodiments, peak power mode can be implemented according to any of the exemplary techniques described and/or illustrated herein. In some embodiments, heat balance in a battery is considered during peak power mode, and current and duration of peak power and/or off-peak power are defined so that heat from the battery per time period is the same with (or similar to) the reference condition (for example, in accordance with Equation 1). In some embodiments, a current and duration of peak power and/or off-peak power can be defined so that heat from the battery per a particular time period during a particular time period under the peak power mode does not exceed (or is less than or equal to) heat from the battery during a particular time period under the reference condition. That is, in some embodiments, heat balance in a battery is considered during peak power mode, and current and duration of peak power and/or off-peak power are defined so that heat from the battery per time period does not exceed the reference condition (or is less than or equal to heat during the reference condition), for example, in accordance with an alternative Equation 1, as follows:

$$H(\text{peak power}) \leq H(\text{ref}) \quad \text{Alternative EQUATION 1}$$

Figure 4:
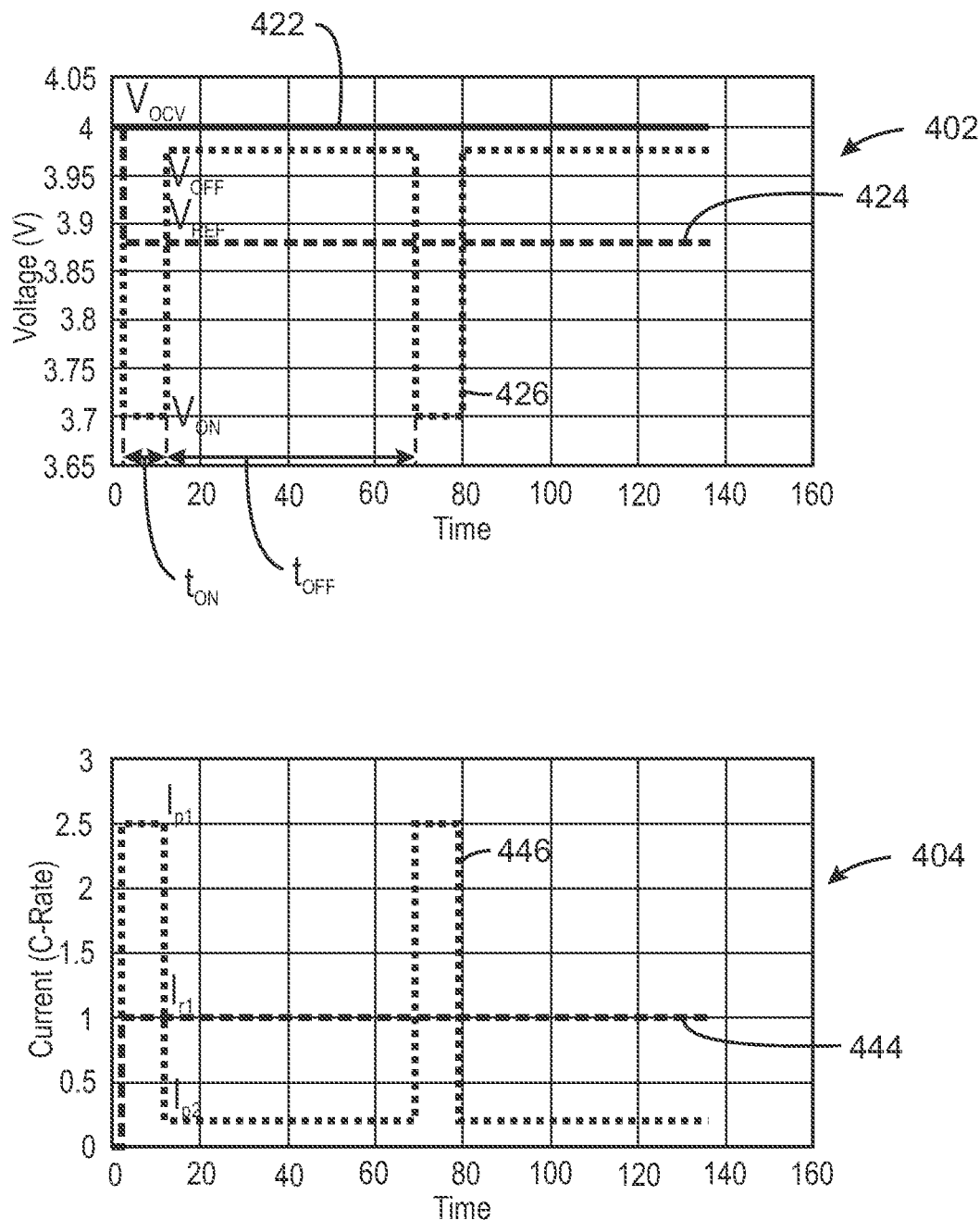
FIG. 4 illustrates battery voltage and current under reference condition and peak power mode in accordance with some embodiments.

FIG. 4 illustrates a graph 400 including battery voltage graph 402 and current graph 404 in accordance with some embodiments. For example, battery voltage 402 and current 404 are shown in accordance with some embodiments under reference condition and under peak power mode. Battery voltage graph 402 includes an open circuit voltage ($V_{OCV}$) 422, a voltage under reference condition ($V_{ref}$) 424, and a voltage 426 under a peak power mode. Current 404 includes a current under reference condition ($I_{r1}$) 444 and a current 446 under a peak power mode.

H(peak power), which is heat under peak power mode, can be calculated according to Equation 2, as follows:

$$H(\text{peak power}) = (V_{OCV} - V_{ON}) \times I_{p1} \times t_{ON} + (V_{OCV} - V_{OFF}) \times I_{p2} \times t_{OFF} \quad \text{EQUATION 2}$$

where $V_{OCV}$ is open circuit voltage, $I_{p1}$ is peak current, $V_{ON}$ is battery voltage during peak current $I_{p1}$, $t_{ON}$ is duration of peak current, $I_{p2}$ is off-peak current, $V_{OFF}$ is battery voltage during off-peak current $I_{p2}$, and $t_{OFF}$ is duration of off-peak current.

Since $V_{OCV} - V_{ON}$ is equal to $I_{p1} \times R$ (where R is battery impedance), and since $V_{OCV} - V_{OFF}$ is equal to $I_{p2} \times R$, H(peak power) can be described according to Equation 3, as follows:

$$H(\text{peak power}) = I_{p1}^2 \times R \times t_{ON} + I_{p2}^2 \times R \times t_{OFF} \quad \text{EQUATION 3}$$

H(ref) (heat under reference condition) can be calculated according to Equation 4, as follows:

$$H(\text{ref}) = (V_{OCV} - V_{REF}) \times I_{r1} \times (t_{ON} + t_{OFF}) \quad \text{EQUATION 4}$$

where $I_{r1}$ is current under reference condition, and $V_{REF}$ is battery voltage during current $I_{r1}$ under reference condition.

Since $V_{OCV} - V_{REF}$ equals $I_{r1} \times R$, H(ref) can also be described according to Equation 5, as follows:

$$H(\text{ref}) = I_{r1}^2 \times R \times (t_{ON} + t_{OFF}) \quad \text{EQUATION 5}$$

In accordance with some embodiments, current and/or duration of peak power mode may be defined so that the following three Equations 1, 3 and 5 are established to result in Equation 6 as follows:

$$H(\text{peak power}) = H(\text{ref}) \quad \text{EQUATION 1}$$

$$H(\text{peak power}) = I_{p1}^2 \times R \times I_{ON} + I_{p2}^2 \times R \times I_{OFF} \quad \text{EQUATION 3}$$

$$H(\text{ref}) = I_{r1}^2 \times R \times (I_{ON} + I_{OFF}) \quad \text{EQUATION 5}$$

$$I_{p1}^2 \times R \times I_{ON} + I_{p2}^2 \times R \times I_{OFF} = I_{r1}^2 \times R \times (I_{ON} + I_{OFF}) \quad \text{EQUATION 6}$$

And Equation 6 can be reduced to result in Equation 7, as follows:

$$I_{p1}^2 \times t_{ON} + I_{p2}^2 \times t_{OFF} = I_{r1}^2 \times (t_{ON} + t_{OFF}) \quad \text{EQUATION 7}$$

Five parameters remain in Equation 7, including $I_{r1}$, $I_{p1}$, $t_{ON}$, $I_{p2}$, and $t_{OFF}$. In some embodiments, four of these five parameters can be defined (for example, by a user). Once four of the parameters are defined, the fifth parameter can then be determined to maintain heat balancing in accordance with some embodiments. In some embodiments, if less than four parameters are defined, possible solutions for two or more parameters may be determined.

For example, when $I_{r1}$ is 1 C, $I_{p1}$ is 2.5 C, $t_{ON}$ is 10 seconds, and $I_{p2}$ is 0.3 C, $t_{OFF}$ can be calculated using Equation 7 as approximately 57 seconds (or approximately 57.7 seconds). In this manner, cycle life under peak power mode can be similar to (and/or better than) cycle life of the reference condition (1 C) in accordance with some embodiments.

It is noted that in some embodiments in which current and duration of peak power and/or off-peak power can be defined so that heat from the battery per a particular time period during a particular time period under the peak power mode does not exceed (or is less than or equal to) heat from the battery during a particular time period under the reference condition (for example, some embodiments implementing Alternative Equation 1), Alternative Equation 6 and Alternative Equation 7 can be implemented, as follows:

$$I_{p1}^2 \times R \times I_{ON} + I_{p2}^2 \times R \times t_{OFF} \leq I_{r1}^2 \times R \times (I_{ON} + I_{OFF}) \quad \text{Alternative EQUATION 6}$$

$$I_{p1}^2 \times I_{ON} + I_{p2}^2 \times t_{OFF} \leq I_{r1}^2 \times (I_{ON} + I_{OFF}) \quad \text{Alternative EQUATION 7}$$

Five parameters remain in Alternative Equation 7, including $I_{r1}$, $I_{p1}$, $t_{ON}$, $I_{p2}$, and $t_{OFF}$. In some embodiments, four of these five parameters can be defined (for example, by a user). Once four of the parameters are defined, the fifth parameter can then be determined to maintain heat balancing in accordance with some embodiments. In some embodiments, if less than four parameters are defined, possible solutions for two or more parameters may be determined.

For example, when $I_{r1}$ is 1 C, $I_{p1}$ is 2.5 C, $t_{ON}$ is 10 seconds, and $I_{p2}$ is 0.3 C, $t_{OFF}$ can be calculated using Equation 7 as being greater than or equal to approximately 57 seconds (or greater than or equal to approximately 57.7 seconds). In this manner, cycle life under peak power mode can be similar to (and/or better than) cycle life of the reference condition (1 C) in accordance with some embodiments.

In some embodiments, a controller or control unit (for example, a processor) can be used to limit peak power levels during peak power mode events (or turbo events). In some embodiments, the peak power levels can be limited in accordance with any of the techniques and/or Equations illustrated and/or discussed herein.

Although FIG. 4 illustrates using two currents $I_{p1}$ and $I_{p2}$ at two levels, it is noted that in some embodiments, more than two currents at more than two levels may be implemented. In some embodiments, for example, more than two different currents (for example, more than two different peak power mode currents) may be implemented while considering battery heat balance (for example, by balancing battery heat relative to a reference condition). The various levels of peak power current may be implemented based on needs for peak power (for example, based on processor needs for peak power). Some embodiments may include more than one peak current levels and/or one or more off-peak current levels, for example, and can include different time durations for each of the currents. In some embodiments, a processor may be slowed down in order to avoid damage to the battery in accordance with techniques described herein (for example, using battery heat balancing).

Figure 5:
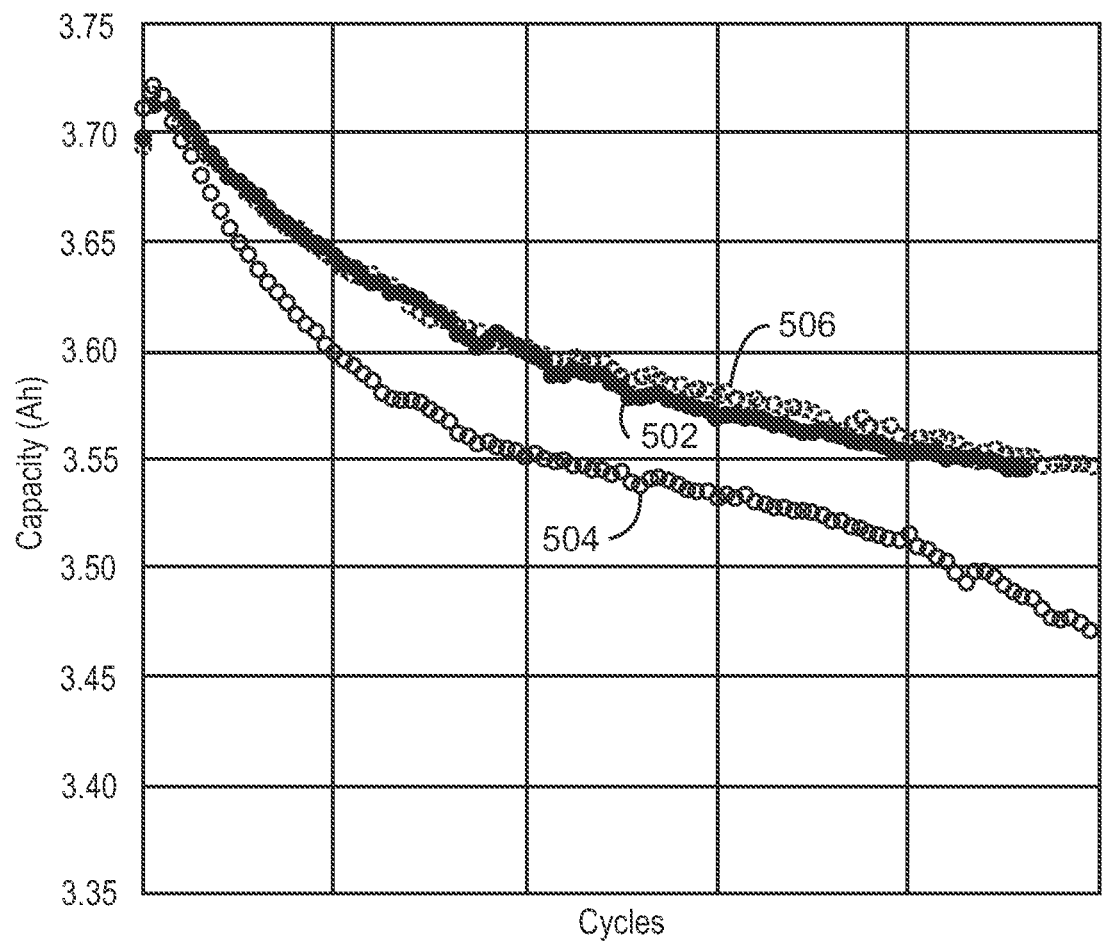
FIG. 5 illustrates a graph illustrating cycle test results under reference and peak power mode conditions.

FIG. 5 illustrates a graph 500 illustrating cycle test results under reference and peak power mode conditions. Graph 500 includes a reference power condition graph 502, a peak power mode condition graph 504, and a peak power mode condition graph 506. In some embodiments, graph 500 illustrates battery capacity over time during reference discharge conditions (graph 502), during a first peak power mode (graph 504), and during a second peak power mode (graph 506). As discussed herein, repeated and uncontrolled use of peak currents can reduce the service life of a battery. For example, cycle test conditions of reference power 502 and peak power mode 504 may be defined as follows, resulting in graph 500, which illustrates that peak power mode 504 can provide worse cycle life than reference mode 502, even though average current during the reference condition and the peak power mode is the same.

For example, in some embodiments, the reference cycle life condition graph 502 illustrated in FIG. 5 can be based on a charge of 1 C constant charge (CC), followed by 4.4V constant voltage (CV) until 0.05 C cutoff, and discharge of 1 C until 3.0V cutoff. The peak power mode cycle life condition graph 504 illustrated in FIG. 5 can be based on a charge that is the same as defined above for the reference cycle life condition, and discharge of 2.5 C for 10 seconds (peak) followed by 0.3 C for 21 seconds (it is noted that this equals 1.0 C on average), and repeating the 2.5 C and 0.3 C discharge until the voltage hits 3.0V and then 1 C discharge until 3.0V cutoff.

FIG. 5 illustrates the reduction in life cycle using a peak power mode as illustrated by graph 504 can reduce the serviceable life perceived by the user. However, in accordance with some embodiments, peak power mode can be enabled without additional cycle life degradation (for example, without additional cycle life degradation perceived by a user) as compared to the reference condition. In accordance with some embodiments, heat balance in a battery can be considered during peak power mode. A current and duration of peak power and/or off-peak power can be defined so that heat from the battery per a particular time period is similar to the reference condition. For example, peak power mode cycle life condition graph 506 illustrated in FIG. 5 can be based on using techniques described herein of maintaining heat from the battery during peak power and/or off-peak power being similar to that of the reference condition (for example, using Equation 7 as described herein). For example, peak power mode cycle life condition graph 506 illustrated in FIG. 5 can be based on a charge that is the same as defined above for the reference cycle life condition, and discharge of 2.5 C for 10 seconds (peak) followed by 0.3 C for 57 seconds, and repeating the 2.5 C and 0.3 C discharge until the voltage hits 3.0V and then 1 C discharge until 3.0V cutoff. In this manner, in accordance with some embodiments, peak power mode can be enabled as illustrated by graph 506 without additional cycle life degradation (for example, without additional cycle life degradation perceived by a user) as compared to the reference condition. In fact, in some embodiments, cycle life degradation may actually be slightly improved.

The foregoing examples of peak power mode may be used in accordance with some embodiments, but it is noted that some actual embodiments may be different. For example, in some embodiments, peak power pulses may be both aperiodic and of variable magnitude.

Figure 6:
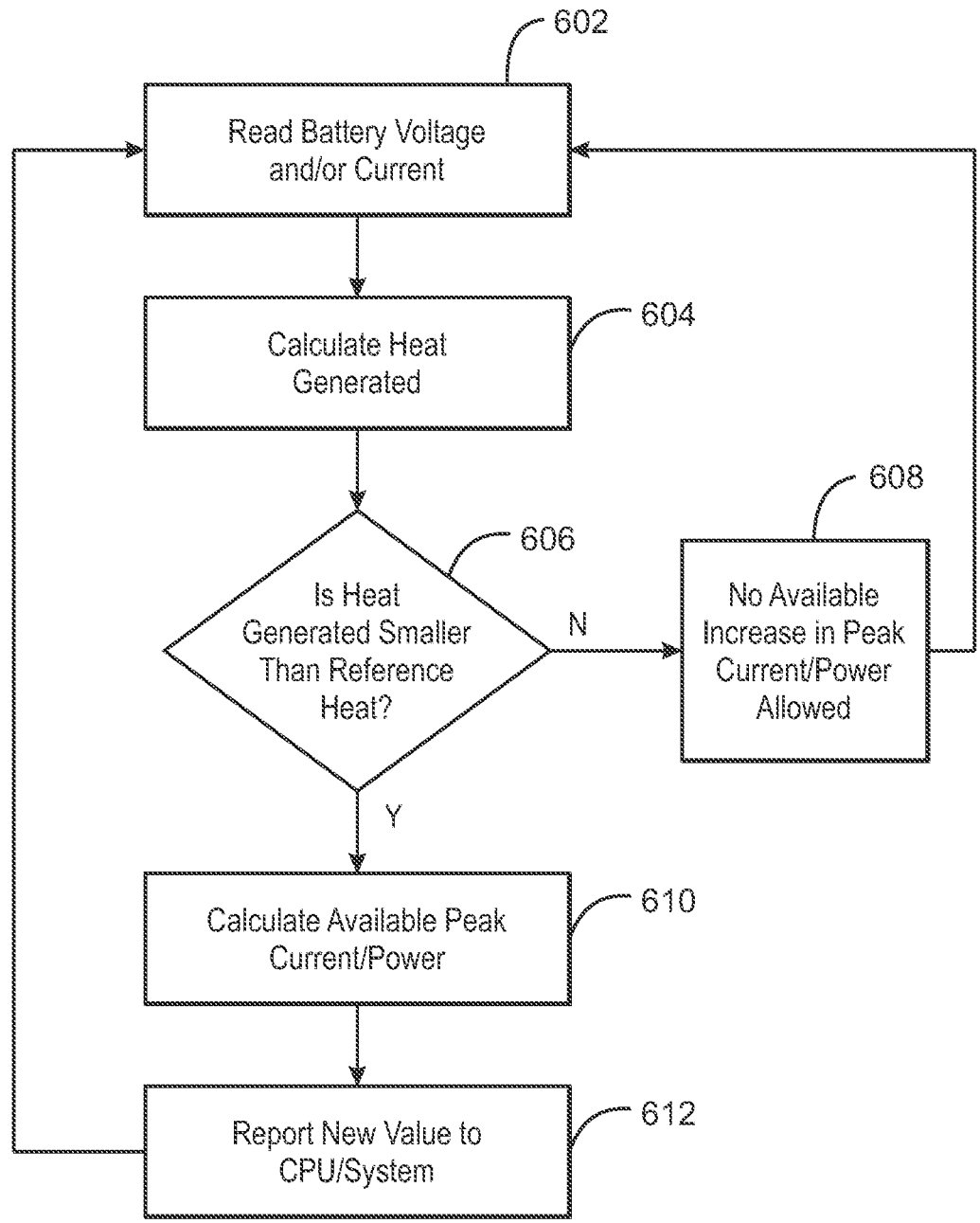
FIG. 6 illustrates a flow implementing battery heat balancing during peak power mode in accordance with some embodiments.

FIG. 6 illustrates a flow 600 implementing battery heat balancing during peak power mode in accordance with some embodiments. In some embodiments, FIG. 6 illustrates a flow 600 implementing battery heat balancing operating to capture actual peak power pulses that are aperiodic and/or have variable magnitude peaks.

In some embodiments, flow 600 can be implemented in firmware of a battery pack (for example, in firmware of battery back 104 and/or in firmware of battery pack 204). In some embodiments, flow 600 can be implemented in firmware and/or in an operating system (OS) of a computing system (for example, in firmware and/or OS of computing system 102 or in firmware and/or OS of a system in system 200). In some embodiments, flow 600 can be using embedded controller 206 and/or using firmware/software 208. In some embodiments, flow 600 can be implemented using fuel gauge IC 242 and/or protection IC 244.

In flow 600, battery voltage and/or battery current are read at 602. Generated heat is calculated at 604. At 606, a determination is made as to whether generated heat is smaller than a reference heat (for example, is smaller than an accumulated reference heat). If heat generated is not less than the accumulated reference heat at 606, no increase in peak current and/or peak power is allowed at 608, and flow returns to 602. If heat generated is less than the accumulated reference heat at 606, available peak current and/or peak power is calculated at 610 (for example, in some embodiments, using Equation 7). The new value calculated at 610 is then reported (for example, to a processor such as a CPU and/or to a computing system) at 612, and flow returns to 602. In some embodiments (for example, included in some embodiments of flow 600 and in other embodiments), a heat situation (for example, a heat situation such as a condition where generated heat is not smaller than a reference heat) is reported (for example, a heat situation is reported to a processor such as a CPU and/or to a computing system) in order that system power is capped until accumulated heat (for example, accumulated battery heat) falls below a reference threshold level.

In accordance with some embodiments, forced cooling and/or a heat spreader may be applied (for example, during peak power mode) to the battery to maintain battery temperature or heat balance similar to that of the battery under the reference condition.

In some embodiments, peak current may be implemented in multiple steps. Many different step variations may be implemented in accordance with some embodiments. For example, peak 1→peak 2→off-peak→peak 1→off-peak→peak 2→off-peak, etc. Although examples have been illustrated and described herein, many different step variations (and/or variations between different steps) may be implemented in accordance with some embodiments.

In some embodiments, heat may be used herein as referring to joule heat. However, in some embodiments, heat by chemical reaction may also be considered (either in addition to joule heat or instead of joule heat, for example). For example, in some embodiments, Equation 9 may be used (for example, instead of Equation 1), as follows:

$$H(\text{peak power}) + H(\text{chemical reaction during peak power}) = H(\text{ref}) + H(\text{chemical reaction during reference condition}) \quad \text{EQUATION 9}$$

where H(chemical reaction during peak power) is a heat by chemical reaction during peak power, and H(chemical reaction during reference condition) is a heat by chemical reaction during reference condition.

It is noted that an alternative Equation 9 may be implemented in accordance with some embodiments, as follows:

$H$(peak power)+$H$(chemical reaction during peak power)≤$H$(ref)+$H$(chemical reaction during reference condition)  Alternative EQUATION 9

In some embodiments, various techniques may be implemented by user setting (for example, a user determining whether to use joule heat or chemical heat, a user choosing one or more values such as $I_{r1}$, $I_{p1}$, $t_{ON}$, $I_{p2}$, and/or $t_{OFF}$, etc.)

In some embodiments, battery degradation rate by heat may be measured in advance, heat output associated with allowable degradation may be selected, and another wave form of peak power mode giving the same degradation of heat may be chosen.

In some embodiments, as a result of heat calculation, if the battery stays within an allowable temperature range, higher peak current may be extracted until battery temperature exceeds an allowable range. For example, an Equation such as Equation 10 or Alternative Equation 10, as follows, may be used (for example, instead of Equation 1 and/or instead of Alternative Equation 1):

$H$(peak power)<$H$(allowable)  EQUATION 10

$H$(peak power)≤$H$(allowable)  Alternative EQUATION 10 where H(allowable) is an allowable heat value. The allowable temperature value H(allowable), or allowable temperature range, may be used. It may be determined by a system manufacturer and stored in a memory or storage space, for example.

In some embodiments, a relationship between discharge current, battery temperature rise and/or degradation, etc. may be predetermined.

In some embodiments, any of the techniques described herein may be implemented by instructions stored in storage or memory as software or firmware on the system side. In some embodiments, any of the techniques described herein may be implemented by instructions stored in storage or memory as software or firmware on the battery pack side (for example, in a fuel gauging IC).

In some embodiments, available peak power and/or peak current may be determined based on a battery thermal budget (for example, by considering allowable heat as part of a battery thermal budget).

In some embodiments, open circuit voltage ($V_{OCV}$) may be (but is not limited to) battery voltage after relaxation (for example, for tens of seconds or for minutes).

In some embodiments, open circuit voltage ($V_{OCV}$) may be directly measured, or may be modeled, or may be retrieved from a lookup table (for example, a lookup table stored in memory or other storage).

In some embodiments, techniques described herein can be implemented in a system, memory space of a system, in a controller, in a memory space of a controller in a system, and/or in a battery pack, for example. In some embodiments, techniques described herein can be implemented in a remote system.

In some embodiments, techniques described herein (and/or implemented by a controller described herein) may be implemented by a firmware embedded solution, an FPGA, a DSP, a discrete ASIC, and/or a processor, etc.

In some embodiments, a system (for example, system 100 and/or system 200) can be one or more of a computing system, a stationary system, a data center system, a server, a car, and/or a system supporting peak power, etc.

Figure 7:
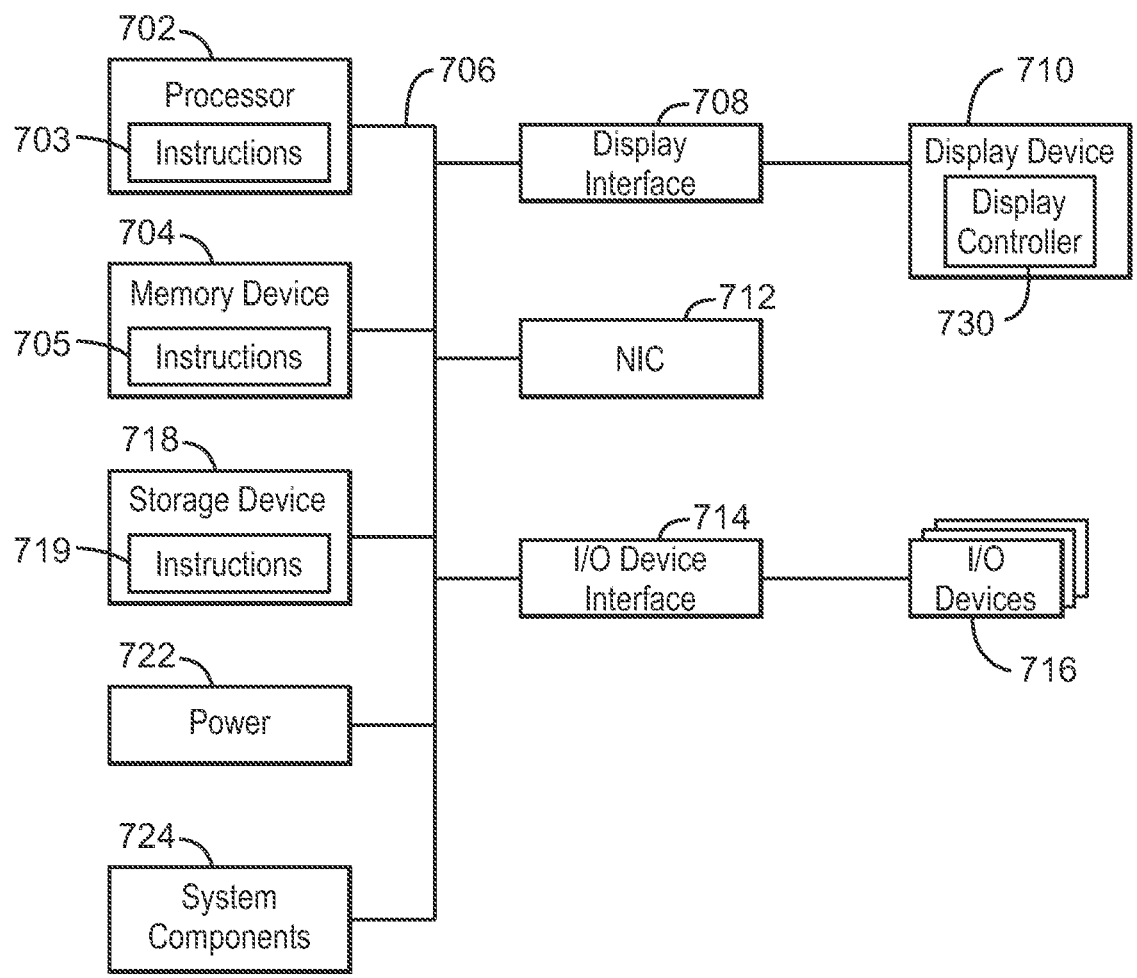
FIG. 7 illustrates a computing system in accordance with some embodiments.

FIG. 7 illustrates a computing system 700 in accordance with some embodiments. FIG. 7 is a block diagram of an example of a computing device 700 in accordance with some embodiments. In some embodiments, computing device 700 may be a computing device including one or more elements of system 100 and/or one or more elements of system 200. For example, in some embodiments, computing device 700 can implement any of the techniques described herein. In some embodiments, one or more elements of computing device 700 can be the same as or similar to, or included in system 100, system 200, battery pack 104, battery pack 204, system 102, voltage adjustment 128, embedded controller 206, processor and computing system components 212, can implement instructions using firmware/software 208, etc. In some embodiments, computing device 700 can implement flow 600. In some embodiments, computing device 700 may provide any techniques or functions illustrated and/or described herein.

In some embodiments, any portion of the flow, circuits or systems illustrated in any one or more of the figures, and any of the embodiments described herein can be included in or be implemented by computing device 700. The computing device 700 may be, for example, a computing device, a controller, a control unit, an application specific controller, and/or an embedded controller, among others.

The computing device 700 may include a processor 702 that is adapted to execute stored instructions (for example, instructions 703), as well as a memory device 704 (or storage 704) that stores instructions 705 that are executable by the processor 702. The processor 702 can be a single core processor, a multi-core processor, a computing cluster, or any number of other configurations. For example, processor 702 can be an Intel® processor such as an Intel® Celeron, Pentium, Core, Core i3, Core i5, or Core i7 processor. In some embodiments, processor 702 can be an Intel® x86 based processor. In some embodiments, processor 702 can be an ARM based processor. The memory device 704 can be a memory device or a storage device, and can include volatile storage, non-volatile storage, random access memory, read only memory, flash memory, or any other suitable memory or storage systems. The instructions that are executed by the processor 602 may also be used to implement any of the techniques as described in this specification and/or illustrated in the drawings. In some embodiments, processor 702 may include the same or similar features or functionality as, for example, various controllers or agents in this disclosure.

The processor 702 may also be linked through the system interconnect 706 (e.g., PCI®, PCI-Express®, NuBus, etc.) to a display interface 708 adapted to connect the computing device 700 to a display device 710. The display device 710 may include a display controller 730. Display device 710 may also include a display screen that is a built-in component of the computing device 700. The display device may also include a computer monitor, television, or projector, among others, that is externally connected to the computing device 700. In some embodiments, computing device 700 does not include a display interface or a display device.

In some embodiments, the display interface 708 can include any suitable graphics processing unit, transmitter, port, physical interconnect, and the like. In some examples, the display interface 708 can implement any suitable protocol for transmitting data to the display device 710. For example, the display interface 708 can transmit data using a high-definition multimedia interface (HDMI) protocol, a DisplayPort protocol, or some other protocol or communication link, and the like In addition, a network interface controller (also referred to herein as a NIC) 712 may be adapted to connect the computing device 700 through the system interconnect 706 to a network (not depicted). The network (not depicted) may be a cellular network, a radio network, a wide area network (WAN), a local area network (LAN), or the Internet, among others.

The processor 702 may be connected through system interconnect 706 to an input/output (I/O) device interface 714 adapted to connect the computing host device 700 to one or more I/O devices 716. The I/O devices 716 may include, for example, a keyboard or a pointing device, where the pointing device may include a touchpad or a touchscreen, among others. The I/O devices 716 may be built-in components of the computing device 700, or may be devices that are externally connected to the computing device 700.

In some embodiments, the processor 702 may also be linked through the system interconnect 706 to a storage device 718 that can include a hard drive, a solid-state drive (SSD), a magnetic drive, an optical drive, a USB flash drive, an array of drives, or any other type of storage, including combinations thereof. In some embodiments, the storage device 718 can include any suitable applications that can be used by processor 702 to implement any of the techniques described herein. In some embodiments, storage 718 stores instructions 719 that are executable by the processor 702. In some embodiments, the storage device 718 can include a basic input/output system (BIOS).

In some embodiments, a power device 722 is provided. For example, in some embodiments, power device 722 can provide battery heat balancing during peak power, or any of the techniques described herein, etc. In some embodiments, power 722 can include one or more sources of power supply such as one or more power supply units (PSUs). In some embodiments, power 722 can be a part of system 700, and in some embodiments, power 722 can be external to the rest of system 700. In some embodiments, power 722 can provide any of the techniques described herein. For example, in some embodiments, power 722 can provide any of the techniques as described in reference to or illustrated in any of the drawings herein.

FIG. 7 also illustrates system components 724. In some embodiments, system components 724 can include any of display, camera, audio, storage, modem, or memory components, or any additional system components. In some embodiments, system components 724 can include any system components for which power, voltage, power management, etc. can be implemented according to some embodiments as described herein.

It is to be understood that the block diagram of FIG. 7 is not intended to indicate that the computing device 700 is to include all of the components shown in FIG. 7 in all embodiments. Rather, the computing device 700 can include fewer or additional components not illustrated in FIG. 7 (e.g., additional memory components, embedded controllers, additional modules, additional network interfaces, etc.). Furthermore, any of the functionalities of power device 722 may be partially, or entirely, implemented in hardware or in a processor such as processor 702. For example, the functionality may be implemented with an application specific integrated circuit, logic implemented in an embedded controller, or in logic implemented in the processor 702, among others. In some embodiments, the functionalities of power device 722 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 722 can be implemented with an integrated circuit.

Figure 8:
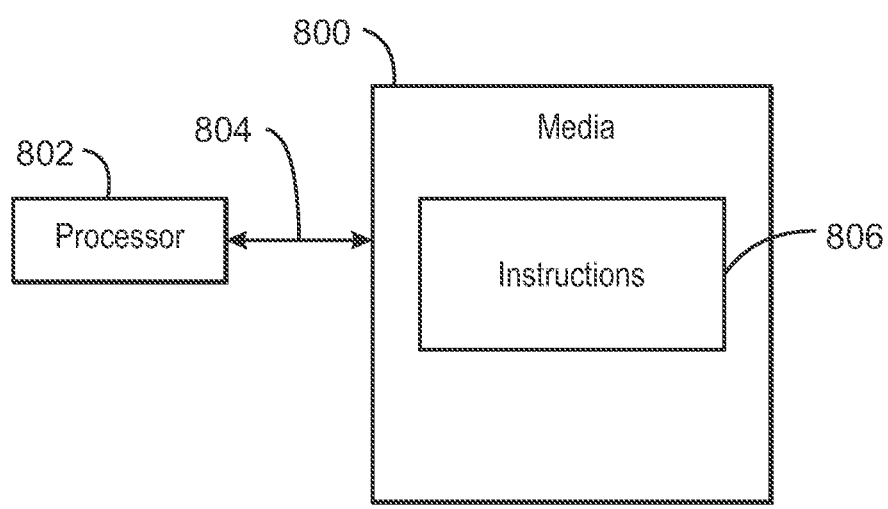
FIG. 8 illustrates one or more processors and one or more media in accordance with some embodiments.

FIG. 8 is a block diagram of an example of one or more processors 802 and one or more tangible, non-transitory computer readable media 800 for peak power supply support, battery charger termination voltage adjustment, etc. The one or more tangible, non-transitory, computer-readable media 800 may be accessed by the processor(s) 802 over a computer interconnect 804. Furthermore, the one or more tangible, non-transitory, computer-readable media 800 may include instructions (or code) 806 to direct the processor(s) 802 to perform operations as described herein. In some embodiments, processor 802 is one or more processors. In some embodiments, processor(s) 802 can perform some or all of the same or similar functions that can be performed by other elements described herein using instructions (code) 806 included on media 800 (for example, some or all of the functions or techniques illustrated in or described in reference to any of FIGS. 1-7). In some embodiments, one or more of processor(s) 802 may include the same or similar features or functionality as, for example, various controllers, units, or agents, etc. described in this disclosure. In some embodiments, one or more processor(s) 802, interconnect 804, and/or media 800 may be included in computing device 700.

Various components discussed in this specification may be implemented using software components. These software components may be stored on the one or more tangible, non-transitory, computer-readable media 800, as indicated in FIG. 8. For example, instructions 806 may be adapted to direct the processor(s) 802 to perform one or more of any of the operations described in this specification and/or in reference to the drawings.

It is to be understood that any suitable number of software components may be included within the one or more tangible, non-transitory computer-readable media 800. Furthermore, any number of additional software components shown or not shown in FIG. 8 may be included within the one or more tangible, non-transitory, computer-readable media 800, depending on the specific application.

The various techniques and/or operations described herein (for example, in reference to any one or more of FIGS. 1-8) may be performed by a control unit comprised of one or more processors, monitoring logic, control logic, software, firmware, agents, controllers, logical software agents, system agents, and/or other modules. For example, in some embodiments, some or all of the techniques and/or operations described herein may be implemented by a system agent. Due to the variety of modules and their configurations that may be used to perform these functions, and their distribution through the system and/or in a different system, they are not all specifically illustrated in their possible locations in the figures.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, a control unit (for example, a processor) is configured to consider battery heat. The control unit is adapted to provide power from a battery to a system during a peak power mode that includes peak power and off-peak power. The control unit is also adapted to consider heat balance in the battery during the peak power mode by providing peak power so that heat of the battery corresponds to a reference condition heat of the battery.

Example 2 includes the subject matter of example 1. The control unit is adapted to maintain a heat from the battery over the time period under peak power mode to be the same as or less than a heat from the battery over the time period under the reference condition.

Example 3 includes the subject matter of any of examples 1-2. The control unit is adapted to maintain a heat from the battery over the time period under peak power mode to be the same as or less than an allowable heat.

Example 4 includes the subject matter of any of examples 1-3. The control unit is adapted to provide peak current in steps including at least one peak current and at least one off-peak current.

Example 5 includes the subject matter of any of examples 1-4. In Example 5, heat from the battery includes a joule heat.

Example 6 includes the subject matter of any of examples 1-5. In Example 6, heat from the battery includes a heat by chemical reaction.

Example 7 includes the subject matter of any of examples 1-6. The control unit is adapted to calculate available peak current and/or available peak power based on a battery thermal budget.

Example 8 includes the subject matter of any of examples 1-7. The control unit is adapted to determine the heat balance based on current under reference condition, duration of peak current, duration of off-peak current, peak current, and off-peak current.

Example 9 includes the subject matter of any of examples 1-8. The control unit is adapted to provide peak current in steps including at least two different peak currents.

Example 10 includes the subject matter of any of examples 1-9. The control unit is adapted to provide peak current in steps including at least two different peak currents and at least two different off-peak currents.

Example 11 In some examples, a method can consider battery heat. The method can include providing power from a battery to a system during a peak power mode that includes peak power and off-peak power. The method can also include considering heat balance in the battery during the peak power mode by providing peak power so that heat of the battery corresponds to a reference condition heat of the battery.

Example 12 includes the subject matter of example 11. The method includes maintaining a heat from the battery over the time period under peak power mode to be the same as or less than a heat from the battery over the time period under the reference condition.

Example 13 includes the subject matter of any of examples 11-12. The method includes maintaining a heat from the battery over the time period under peak power mode to be the same as or less than an allowable heat.

Example 14 includes the subject matter of any of examples 11-13. The method includes providing peak current in steps including at least one peak current and at least one off-peak current.

Example 15 includes the subject matter of any of examples 11-14. In example 15, the heat from the battery includes a joule heat.

Example 16 includes the subject matter of any of examples 11-15. In example 16, the heat from the battery includes a heat by chemical reaction.

Example 17 includes the subject matter of any of examples 11-16. The method includes calculating available peak current and/or available peak power based on a battery thermal budget.

Example 18 includes the subject matter of any of examples 11-17. The method includes determining the heat balance based on current under reference condition, duration of peak current, duration of off-peak current, peak current, and off-peak current.

Example 19 includes the subject matter of any of examples 11-18. The method includes providing peak current in steps including at least two different peak currents.

Example 20 includes the subject matter of any of examples 11-19. The method includes providing peak current in steps including at least two different peak currents and at least two different off-peak currents.

Example 21 In some examples, one or more tangible, non-transitory machine readable media includes a plurality of instructions that, in response to being executed on at least one processor, cause the at least one processor to provide power from a battery to a system during a peak power mode that includes peak power and off-peak power, and consider heat balance in the battery during the peak power mode by providing peak power so that heat of the battery corresponds to a reference condition heat of the battery.

Example 22 includes the subject matter of example 21. The method one or more tangible, non-transitory machine readable media includes a plurality of instructions that, in response to being executed on at least one processor, cause the at least one processor to maintain a heat from the battery over the time period under peak power mode to be the same as or less than a heat from the battery over the time period under the reference condition.

Example 23 includes the subject matter of any of examples 21-22. The one or more tangible, non-transitory machine readable media include a plurality of instructions that, in response to being executed on at least one processor, cause the at least one processor to maintain a heat from the battery over the time period under peak power mode to be the same as or less than an allowable heat.

Example 24 includes the subject matter of any of examples 21-23. The one or more tangible, non-transitory machine readable media include a plurality of instructions that, in response to being executed on at least one processor, cause the at least one processor to provide peak current in steps including at least one peak current and at least one off-peak current.

Example 25 includes the subject matter of any of examples 21-24. In example 25, the heat from the battery includes a joule heat.

Example 26 includes the subject matter of any of examples 21-25. In example 26, the heat from the battery includes a heat by chemical reaction.

Example 27 includes the subject matter of any of examples 21-26. The one or more tangible, non-transitory machine readable media include a plurality of instructions that, in response to being executed on at least one processor, cause the at least one processor to calculate available peak current and/or available peak power based on a battery thermal budget.

Example 28 includes the subject matter of any of examples 21-27. The one or more tangible, non-transitory machine readable media include a plurality of instructions that, in response to being executed on at least one processor, cause the at least one processor to determine the heat balance based on current under reference condition, duration of peak current, duration of off-peak current, peak current, and off-peak current.

Example 29 includes the subject matter of any of examples 21-28. The one or more tangible, non-transitory machine readable media include a plurality of instructions that, in response to being executed on at least one processor, cause the at least one processor to provide peak current in steps including at least two different peak currents.

Example 30 includes the subject matter of any of examples 21-29. The one or more tangible, non-transitory machine readable media include a plurality of instructions that, in response to being executed on at least one processor, cause the at least one processor to provide peak current in steps including at least two different peak currents and at least two different off-peak currents.

Example 31 In some examples, an apparatus is to consider battery heat. The apparatus includes means for providing power from a battery to a system during a peak power mode that includes peak power and off-peak power, and means for considering heat balance in the battery during the peak power mode by providing peak power so that heat of the battery corresponds to a reference condition heat of the battery.

Example 32 includes the subject matter of example 31. The apparatus includes means for maintaining a heat from the battery over the time period under peak power mode to be the same as or less than a heat from the battery over the time period under the reference condition.

Example 33 includes the subject matter of any of examples 31-32. The controller includes means for maintaining a heat from the battery over the time period under peak power mode to be the same as or less than an allowable heat.

Example 34 includes the subject matter of any of examples 31-33. The controller includes means for providing peak current in steps including at least one peak current and at least one off-peak current.

Example 35 includes the subject matter of any of examples 31-34. In example 35, the heat from the battery includes a joule heat.

Example 36 includes the subject matter of any of examples 31-35. In example 36, the heat from the battery includes a heat by chemical reaction.

Example 37 includes the subject matter of any of examples 31-36. The apparatus includes means for calculating available peak current and/or available peak power based on a battery thermal budget.

Example 38 includes the subject matter of any of examples 31-37. The controller includes means for determining the heat balance based on current under reference condition, duration of peak current, duration of off-peak current, peak current, and off-peak current.

Example 39 includes the subject matter of any of examples 31-38. The controller includes means for providing peak current in steps including at least two different peak currents.

Example 40 includes the subject matter of any of examples 31-39. The controller includes means for providing peak current in steps including at least two different peak currents and at least two different off-peak currents.

Example 41 In some examples, a system includes a battery and a control unit configured to consider battery heat. The control unit is adapted to provide power from the battery during a peak power mode that includes peak power and off-peak power, and to consider heat balance in the battery during the peak power mode by providing peak power so that heat of the battery corresponds to a reference condition heat of the battery.

Example 42 includes the subject matter of example 41. The control is adapted to maintain a heat from the battery over the time period under peak power mode to be the same as or less than a heat from the battery over the time period under the reference condition.

Example 43 includes the subject matter of any of examples 41-42. The control is adapted to maintain a heat from the battery over the time period under peak power mode to be the same as or less than an allowable heat.

Example 44 includes the subject matter of any of examples 41-43. The control is adapted to provide peak current in steps including at least one peak current and at least one off-peak current.

Example 45 includes the subject matter of any of examples 41-44. In example 45, the heat from the battery includes a joule heat.

Example 46 includes the subject matter of any of examples 41-45. In example 46, the heat from the battery includes a heat by chemical reaction.

Example 47 includes the subject matter of any of examples 41-46. The control is adapted to calculate available peak current and/or available peak power based on a battery thermal budget.

Example 48 includes the subject matter of any of examples 41-47. The control is adapted to determine the heat balance based on current under reference condition, duration of peak current, duration of off-peak current, peak current, and off-peak current.

Example 49 includes the subject matter of any of examples 41-48. The control is adapted to provide peak current in steps including at least two different peak currents.

Example 50 includes the subject matter of any of examples 41-49. The control is adapted to provide peak current in steps including at least two different peak currents and at least two different off-peak currents.

Example 51 includes the subject matter of any of examples 41-50. The system includes means to perform a method as in any other example.

Example 52 In some examples, an apparatus includes means to perform a method as in any other example.

Example 53 In some examples, machine-readable storage includes machine-readable instructions, when executed, to implement a method or realize an apparatus as in any other example.

Example 54 In some examples, one or more machine readable medium include(s) code, when executed, to cause a machine to perform the method of any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus, comprising:
   a battery, wherein the battery can discharge over a time period in a reference condition with a reference current and a reference heat; and
   a circuit coupled to the battery, wherein the circuit is to:
      apply power from the battery to a system during a peak power mode that includes a peak power and an off-peak power; and
      apply heat balance in the battery during the peak power mode over the time period by setting a magnitude and duration of the peak power and a magnitude and duration of the off-peak power so that heat of the battery during the peak power mode is no greater than the reference heat.

2. The apparatus of claim 1, wherein the circuit is to maintain the heat of the battery over the time period under the peak power mode to be same as or less than an allowable heat.

3. The apparatus of claim 1, wherein the heat of the battery includes a joule heat.

4. The apparatus of claim 1, wherein the circuit is to calculate available peak current and/or available peak power based on a battery thermal budget.

5. The apparatus of claim 1, wherein the circuit is to determine the heat balance based on the reference current, the duration of the peak power, the duration of the off-peak power, a peak current during the peak power, and an off-peak current during the off-peak power.

6. The apparatus of claim 1, wherein the circuit is to provide peak current in phases including at least two different peak currents.

7. The apparatus of claim 1, wherein the reference condition is a reference discharge mode of the battery at a specified C rate.

8. The apparatus of claim 1, wherein during the peak power mode, the circuit is to provide peak current in steps including at least two different peak currents and at least two different off-peak currents.

9. The apparatus of claim 1, wherein:
   the heat of the battery during the peak power mode is an accumulated heat over the time period; and
   the reference heat is an accumulated heat over the time period.

10. The apparatus of claim 1, wherein the heat of the battery during the peak power mode is H(peak power)=$I_{p1}^2 \times R \times t_{ON} + I_{p2}^2 \times R \times t_{OFF}$, wherein $I_{p1}$ is a current of the battery during the peak power, R is an impedance of the battery, $t_{ON}$ is the duration of the peak power, $I_{p2}$ is a current of the battery during the off-peak power, and $t_{OFF}$ is the duration of the off-peak power.

11. The apparatus of claim 10, wherein the reference heat is H(ref)=$I_{r1}^2 \times R \times (t_{ON} + t_{OFF})$, where $I_{r1}$ is the reference current of the battery in the reference condition over the time period.

12. The apparatus of claim 10, wherein the reference heat H(ref)=$(V_{OCV} - V_{REF}) \times I_{r1} \times (t_{ON} + t_{OFF})$, where $V_{OCV}$ is an open circuit voltage, $V_{REF}$ is voltage of the battery during the reference condition over the time period, and $Ir_1$ is the reference current of the battery in the reference condition over the time period.

13. The apparatus of claim 1, wherein the setting the magnitude and duration of the peak power and the magnitude and duration of the off-peak power so that the heat of the battery during the peak power mode is same as or less than the reference heat comprises setting $I_{p1}^2 \times t_{ON} + I_{p2}^2 \times t_{OFF} \leq I_{r1}^2 \times (I_{ON} + I_{OFF})$, where
$I_{p1}$ is a current of the battery during the peak power,
$t_{ON}$ is the duration of the peak power,
$I_{p2}$ is a current of the battery during the off-peak power, and
$t_{OFF}$ is the duration of the off-peak power.

14. The apparatus of claim 1, wherein during the peak power mode, a current of the battery is at one level during the peak power and another level during the off-peak power.

15. A system, comprising:
a memory to store one or more instructions;
a processor circuitry to execute the one or more instructions;
a voltage regulator coupled to the processor circuitry; and
a battery pack coupled to the voltage regulator, wherein the battery pack includes:
a battery; and
a control circuit coupled to the battery, wherein the control circuit is to:
apply power from the battery to a computing system over a time period during a peak power mode that includes a peak power period and off-peak power period; and
apply heat balance in the battery during the peak power mode by controlling heat of the battery to be no greater than a reference heat of the battery, wherein the reference heat is a function of $t_{ON}$, a duration of the peak power period, and $t_{OFF}$, a duration of the off-peak power period.

16. The system of claim 15, wherein the control circuit is to maintain the heat of the battery over the time period during the peak power mode to be same as or less than an allowable heat.

17. The system of claim 15, wherein the control circuit is to provide peak current in steps including at least one peak current and at least one off-peak current.

18. The system of claim 15, wherein degradation of the battery due to the heat during the peak power mode is reduced compared to degradation of the battery with the reference heat.

19. The system of claim 15, wherein the reference heat is H(ref)=$I_{r1}^2 \times R \times (t_{ON} + t_{OFF})$, where $I_{r1}$ is a reference current of the battery in a reference condition over the time period, R is an impedance of the battery, $t_{ON}$ is the duration of the peak power period, and $t_{OFF}$ is the duration of the off-peak power period.

20. The system of claim 15, wherein the reference heat is H(ref)=$(V_{OCV} - V_{REF}) \times I_{r1} \times (t_{ON} + t_{OFF})$, where $V_{OCV}$ is an open circuit voltage, $V_{REF}$ is voltage of the battery during a reference condition over the time period, $I_{r1}$ is a reference current of the battery in the reference condition over the time period, $t_{ON}$ is the duration of the peak power period, and $t_{OFF}$ is the duration of the off-peak power period.

21. One or more non-transitory machine-readable media comprising a plurality of instructions that, in response to being executed on at least one processor, cause the at least one processor to:
apply power from a battery to a computing system during a peak power mode that includes peak power and off-peak power; and
during the peak power mode, determine whether heat generated by the battery is smaller than a reference heat, wherein if the heat generated by the battery is not less than the reference heat, prevent an increase in peak current and/or power of the battery, and if the heat generated by the battery is less than the reference heat, allow an increase in the peak current and/or power of the battery.

22. The one or more non-transitory machine-readable media of claim 21, wherein the instructions, in response to being executed on the at least one processor, further cause the at least one processor to:
cause the battery to continue to provide power to the computing system during application of heat balance in the peak power mode.

23. The one or more non-transitory machine-readable media of claim 21, wherein the instructions, in response to being executed on the at least one processor, further cause the at least one processor to:
if the heat generated by the battery is not less than the reference heat, report to the computing system to cap a power of the computing system until the heat generated by the battery falls below the reference heat.

* * * * *

UNITED STATES PATENT AND TRADEMARK OFFICE
CERTIFICATE OF CORRECTION

| | |
|---|---|
| PATENT NO. | : 11,644,877 B2 |
| APPLICATION NO. | : 17/357861 |
| DATED | : May 9, 2023 |
| INVENTOR(S) | : Naoki Matsumura, Andy Keates and Brian Fritz |

Page 1 of 1

It is certified that error appears in the above-identified patent and that said Letters Patent is hereby corrected as shown below:

In the Claims

Column 19
Lines 12-13, "... reference heat H..." should read -- reference heat is H --

Signed and Sealed this
Seventh Day of May, 2024

Katherine Kelly Vidal
*Director of the United States Patent and Trademark Office*